United States Patent [19]

Nussbaumer et al.

[11] 4,234,528
[45] Nov. 18, 1980

[54] ASYMMETRICAL ULTRAFILTRATION MEMBRANE BASED ON CELLULOSE HYDRATE

[75] Inventors: Dietmar Nussbaumer; Horst Perl, both of Göttingen, Fed. Rep. of Germany

[73] Assignee: Sartorius GmbH, Göttingen, Fed. Rep. of Germany

[21] Appl. No.: 28,804

[22] Filed: Apr. 10, 1979

[30] Foreign Application Priority Data

Apr. 13, 1978 [DE] Fed. Rep. of Germany ....... 2816085

[51] Int. Cl.³ ...................... B01D 13/00; B01D 31/00; B29D 27/04
[52] U.S. Cl. ................................. 264/41; 210/500 M; 536/69; 536/76
[58] Field of Search ...................... 536/69, 76; 264/41; 210/500 M

[56] References Cited

U.S. PATENT DOCUMENTS

| | | | |
|---|---|---|---|
| 3,412,184 | 11/1968 | Sharples et al. | 264/41 |
| 3,475,375 | 10/1969 | Yates | 264/41 |
| 3,901,810 | 8/1975 | Brooks et al. | 264/41 |
| 3,954,925 | 5/1976 | Böddeker | 264/41 |
| 3,957,935 | 5/1976 | Staude | 264/41 |
| 4,026,978 | 5/1977 | Mungle et al. | 264/41 |
| 4,145,295 | 3/1979 | Kutowy et al. | 264/41 |
| 4,147,622 | 4/1979 | Nussbaumer | 264/41 |

FOREIGN PATENT DOCUMENTS 1406213 9/1975 United Kingdom.

Primary Examiner—Ronald W. Griffin
Attorney, Agent, or Firm—Browdy and Neimark

[57] ABSTRACT

An asymmetrical ultrafiltration membrane based on cellulose hydrate which may be dried without destructive shrinkage and which has been saponified without reduction in flow-through or separation performance is prepared by adding hydrophobic synthetic silicic acid to a casting solution based on cellulose triacetate optionally partially substituted by cellulose diacetate, and then casting the cellulose acetate membrane and saponifying to the cellulose hydrate form.

13 Claims, No Drawings

ASYMMETRICAL ULTRAFILTRATION MEMBRANE BASED ON CELLULOSE HYDRATE

FIELD OF THE INVENTION

The present invention relates to an asymmetrical ultrafiltration membrane based on cellulose hydrate and more particularly to such membranes having improved dryability without reduction in output or protein separation.

BACKGROUND OF THE INVENTION

It is known to carry out the drying of ultrafiltration membranes after impregnation with glycerin. However, both in connection with cellulose acetate membranes and also in connection with cellulose hydrate membranes, there occurs a reduction of the flow-through output, and in hydrate membranes there arises the additional difficulty that a disturbance-free dryability is not assured, and also the protein separation is not retained.

While it is true that there are available cellulose acetate membranes with excellent properties, in some cases, for example when the membrane to be employed must be resistant to solvents, cellulose acetate membranes and specifically also cellulose triacetate membranes and most of the other polymeric membranes cannot be used because they are destroyed by swelling or dissolution. Cellulose hydrate, on the other hand, is insoluble in organic solvents and may therefore be employed without difficulty.

It is known that asymmetrical cellulose acetate membranes may be converted by saponification into cellulose hydrate membranes having the same structure (German Offenlegungsschrift No. 2,419,930). The saponification is, however, always accompanied by a more or less pronounced deterioration of the membrane properties (decrease of the flow-through rate and of the protein density). This may be of considerable disadvantageous significance also for acetate membranes, and particularly in a case where the saponification occurs unintentionally during the operation, i.e. as a result of extreme pH values.

It is known to carry out the drying of ultrafiltration membranes, particularly acetate membranes, after impregnation with glycerin, wherein the impregnation is intended to prevent an irreversible flow-through reduction and embrittlement or shrinkage. However, the drying of asymmetrical cellulose hydrate ultrafiltration membranes, because of their high water absorption capacity, is accompanied, even after glycerin impregnation, by a further strong output reduction and/or destruction by shrinking.

Known cellulose hydrate ultrafiltration membranes must therefore be stored and treated in the moist condition, which renders processing thereof difficult. Furthermore, it is necessary in this case to add preservation agents during storage because cellulose hydrate when in the moist condition represents a nutrient medium for germs (bacteria, fungi).

SUMMARY OF THE INVENTION

Therefore it is an object of the present invention to provide for a membrane of the type mentioned hereinabove in which the properties of the unsaponified acetate membrane, namely flow-through output, protein separation, and non-destructive dryability, are retained.

This object is obtained with an asymmetrical ultrafiltration membrane based on cellulose hydrate by the addition of hydrophobic synthetic silicic acid to the casting solution of the starting membrane from cellulose acetate which is then converted by saponification into the cellulose hydrate membrane. When a cellulose hydrate membrane is desired, it is not absolutely necessary to start from casting solutions containing triacetate, or predominantly triacetate, although this is preferred because of the better properties of the membranes consisting entirely or predominantly of triacetate. An addition of up to 30% by weight diacetate for the starting membrane is, however, possible in most cases.

Such membranes will then no longer exhibit the afore-mentioned disadvantages and may be impregnated with glycerin in the conventional manner and dried without difficulty.

It has surprisingly been found that by addition of hydrophobic synthetic silicic acid (for example Aerosil R 972 or SIPERNAT 17, Degussa) to the casting solution a flawless wettability of the dried membrane and conservation of the flow-through rates are effectively achieved. In contrast to the expectations which are attributed to the silicic acid having been rendered hydrophobic on the basis of the chemical-physical properties thereof, the addition of a hydrophobic filler acts in the direction of increasing, or in any case preserving the hydrophilic condition of the end product.

DETAILED DESCRIPTION OF PREFERRED EMBODIMENTS

Hydrophobic synthetic silicic acids are known. These are products made either pyrogenically or by precipitation which, analytically considered, are fairly pure $SiO_2$, in which the hydroxyl groups present at the surface of the silicic acid and/or of the $SiO_2$ are brought into reciprocal action with suitable reaction partners and the silicic acid is thereby rendered hydrophobic. Best known among the pyrogenic silicic acids is the type Aerosil by the Degussa company. These silicic acids are produced by hydrolysis of silicon tetrachloride in an oxyhydrogen flame and have an $SiO_2$ content of more than 99.8%. They are composed of amorphous spherical particles which have a diameter of from several $\mu m$ to 40 $\mu m$. In a volume of approximately 15 ml, 1 gram of such silicic acid has a surface of 100 to 400 $m^2$ and more. Generally speaking, the figure following the designation corresponds approximately to this surface accoding to BET. In the silicic acid having been rendered hydrophobic, the $SiO_2$ content is slightly lower because of the hydrophobe addition.

The precipitation silicic acids are generally obtained by conversion of alkalisilicate solutions with acids in the form of white deposits of amorphous silicic acids which, after filtering and washing, are dried and, if necessary, additionally ground. Drying is effected primarily by spray-drying. The best known products of this kind are the sipernates. SIPERNAT 17 is an hydrophobic product, namely a carrier silicic acid yielded by spray-drying of aqueous silicic acid suspensions, whose secondary particles are about 80% within the range of between 40 and 90 microns. The size and character of the secondary particles are determined by the conditions of the spray-drying process. Present also at the surface of these hydrophilic precipitation silicic acids are free hydroxyl groups which lead, by conversion with alkyl halide silanes, to hydrophobic silicic acids in which the hydroxyl groups are replaced by organic residues. In the case of SIPERNAT 17, this is the reaction product of a precipitation silicic acid with organochlorosilane. The mean particle size of the secondary particles is in this case only 3 μm, the BET surface amounts to approximately 110 m²/g, and the pH value of a 5% aqueous dispersion in water to acetone or methanol 1:1 is about 6.

With regard to hydrophobic silicic acid yielded by flame hydrolysis, attention is here directed to the following literature sources: "Chemiker-Zeitung/Chemische Apparatur" [Chemists' Newspaper/Chemical Apparatus] 89 (1965), pp. 437 to 440, issue 13, as well as the prospectus of the Degussa company "Hydrophobes Aerosil" [Hydrophobic Aerosil], manufacture, properties, and behavior. With regard to hydrophobic silicic acid obtained by precipitation, attention is directed to the series of pamphlets Application Techniques Pigments No. 30 "SIPERNAT und AEROSIL fuer di Futtermittelindustrie" [SIPERNAT and AEROSIL for the Coating Agent Industry] of the Degussa company, date of issue June 20, 1969, in which the preparation of SIPERNAT 17 has been described in detail. The production of this type of silicic acid has been explained in earlier publications of the Degussa company. All of these publications of the firm Degussa are meant to be explicitly incorporated by reference into the present disclosure.

The use of hydrophilic silicic acids, for example of the type Aerosil COK 84, 200, leads to the increase of the wettability, but at the same time during saponification also to considerable shrinkage and to a considerable reduction in output during drying, i.e. practically to all the disadvantages which arise without the inventive silicic acid addition in hydrate membranes during the saponification of the acetate membranes. For obtaining the object sought, the following framework values are essential for the invention:

It is necessary to employ in the casting solution 2 to 50% by weight, particularly 10 to 50% by weight of hydrophobic synthetic silicic acid, referred to the total solid content of the final membrane (hydrate+silicic acid). Since the membrane is cast from a casting solution which contains cellulose acetate, particularly triacetate, if desired in mixture with diacetate, as membrane former, it is necessary to convert. Starting from triacetate membranes upon saponification, a 1.75-fold content of the silicic acid is present in the acetate casting solution as compared to the final membrane, if reference is made to the combined solids hydrate+silicic acid in the final membrane and/or triacetate+silicic acid in the starting casting solution, since, starting out from triacetate, about 42% of the weight is removed during saponification. In case of the addition of diacetate, this quantity is correspondingly smaller, yet the addition of silicic acid may be conveniently computed from the molecular weight difference between triacetate and diacetate and has therefore been indicated herein at all times referred to the hydrate. When, accordingly, 2% of silicic acid, based on hydrate+silicic acid, is desired in the hydrate membrane, this would mean a quantity of 3.5% by weight of silicic acid in the starting solution when using cellulose triacetate.

The mechanical strength will decrease if the silicic acid content is too high, for example if it amounts to more than 50% of the total solid content of the saponified hydrate membrane (and accordingly about 87% in the casting solution when using triacetate).

Since, for the purpose of producing hydrate membranes, one starts out with acetate membranes, attention is directed to the known working procedure for asymmetrical acetate membranes with regard to the composition of the casting solution and the casting conditions.

The ratio of acetone to dioxane in the casting solution amounts to 2:1 to 1:2, preferably 0.8 to 1.2:1.

The share of formamide, referred to the solid content, determines the separating boundary. Depending upon the desired separating boundary, the ratio of solid content to formamide is about 1:0.8 to 1:4.

Formamide may be replaced either partially or completely by other lower aliphatic amides, preferably acetamide.

With respect to the composition of the casting solution and of the casting process for asymmetrical triacetate membranes which also contain diacetate, if desired, particular attention is directed to the German Offenlegungsschrift No. 26 21 519.0. Such membranes are especially preferred.

Employed as cellulose triacetate is preferably a relatively low-molecular triacetate, particularly those types whose viscosity ($\eta$) in a 2% solution in methylene chloride/methanol 9/1, measured according to Hoeppler at 25° C., amounts to maximally 10 cP. Viscosities around 7.5 cP to 10 cP are very well suitable. The acetyl content amounts preferably to at least about 43%, particularly 43.5% or more. Pure triacetate would have an acetyl content of 44.8% which, however, is hardly achieved in actual practice. The types T 900 and T 700 of the Bayer company, for example, are very well suitable. For the purpose of obtaining a specific separating boundary, the triacetate may be partially mixed with cellulose diacetate, for example with up to 30% diacetate, referred to CTA. A suitable diacetate type is, for example, E 398-3 (Eastman).

According to particularly preferred embodiments, the addition amounts to 20 to 45% by weight, referred to the total solid content, of the final membrane (hydrate+silicic acid), particularly 30 to 35% by weight.

Pyrogenic silicic acid, particularly the type R 972 of the Degussa company, is presently preferred.

The casting of the membranes takes place preferably according to the precipitating bath process while using ice water as precipitating agent. Here again reference is made to the already cited German Offenlegungsschrift No. 26 21 519.0.

Cellulose hydrate membranes with the inventive addition of silicic acid having been rendered hydrophobic display also after saponification of the cellulose triacetate (or diacetate) to cellulose hydrate the same filtration properties as prior to saponification and may be dried with the addition of glycerin. This is very surprising since, as has already been set forth above, the saponification leads to a deterioration of the membrane properties, as is well known, and the hydrate membranes shrink considerably during drying.

This is particularly disadvantageous when the saponification occurs unintentionally from acetate membranes during the operation, for example as a result of extreme pH values. For this reason the addition of hydrophobic silicic acid is of great advantage also for acetate membranes; in this case, however, in the somewhat smaller quantity of 1 to 30% by weight, particularly 3 to 25% by weight, referred to the total solids.

It is not known at this time why only the addition of hydrophobic silicic acid has these favorable properties while hydrophilic silicic acid as well as also other fillers do not exhibit these properties. With a high degree of probability, however, the positive effects in the case of the saponified membranes could be due to a reduction of the water absorption capacity of the membrane matrix in the presence of the hydrophobic filler.

The following examples are intended to elucidate the present invention. All percent data are percent by weight. In order to show that the good properties of the starting acetate membrane are not impaired by the saponification if silicic acid is present, also the properties of the starting membrane with and without silicic acid addition will be indicated.

EXAMPLE 1

| casting solution | 11% cellulose triacetate (T 700, Bayer) |
| --- | --- |
| | 3% hydrophobic pyrogenic silicic acid (Aerosil R 972, Degussa) |
| | 39% acetone |
| | 22% dioxane |
| | 25% formamide |

The casting solution is doctored onto a casting drum rotating within a precipitating bath of 0° C. The residence time in the air prior to immersion into the precipitating bath is 20 seconds. The precipitated undried membrane is saponified for 5 minutes in a 5% ethanolic potassium hydroxide, washed, impregnated with a 30% glycerin solution, and dried.

A comparison of the membrane properties prior to and after drying reveals the following results:

| | | [undried] not dried | dried |
| --- | --- | --- | --- |
| $D_{H2O}$ | $(l/m^2h)$ | 301 | 275 |
| $D_{Ser}$ | $(l/m^2h)$ | 195 | 175 |
| $R_{Ser}$ | (%) | 98.1 | 99.2 |
| $D_{My}$ | $(l/m^2h)$ | 167 | 155 |
| $R_{My}$ | (%) | 95.7 | 96.5 |
| $D_{Cyt}$ | $(l/m^2h)$ | 208 | 190 |
| $R_{Cyt}$ | (%) | 68.0 | 66.5 |
| test conditions: | | | |
| filtering pressure: | | 1 bar | |
| filtering apparatus: | | stirred ultrafiltration cell | |
| concentration of the test solutions: | | 0.1% test protein in a 0.9% common salt solution | | meaning of the symbols:
D=flow-through output $(l/m^2h)$ (In protein solutions, the average flow-through output has been indicated with a concentration from the 0.1% solutions up to 2%).
R=portein retention (%)
indices:
Ser=serum albumin from oxen, MG=67.000
My=myoglobin from whales, MG=17.000
Cyt=cytochrome C from horse hearts, MG=12.900

EXAMPLE 1a (Starting Membrane Having the Same Composition in the Casting Solution, i.e. with Silicic Acid)

The membrane according to claim 1 is impregnated without saponification immediately after precipitation with an aqueous 30% glycerin solution and, as shown in Example 1, dried in a hot air current of 60° C.

The membrane properties prior to and after drying are as follows:

| | | not dried | dried |
| --- | --- | --- | --- |
| $D_{H2O}$ | $(l/m^2h)$ | 292 | 282 |
| $D_{Ser}$ | $(l/m^2h)$ | 209 | 185 |
| $R_{Ser}$ | (%) | 99.3 | 99.4 |
| $D_{My}$ | $(l/m^2h)$ | 160 | 158 |
| $R_{My}$ | (%) | 95.8 | 96.2 |
| $D_{Cyt}$ | $(l/m^2h)$ | 250 | 226 |
| $R_{Cyt}$ | (%) | 55 | 68 |

The test conditions are the same as in Example 1.

It is apparent that in the case of the saponified hydrate membrane, the good properties of the starting membrane are essentially retained even after drying.

The following comparative Example 1b shows a silicic acid-free starting membrane while the subsequent Example 1c shows the same membrane after saponification, and specifically when not dried and when dried.

EXAMPLE 1b (Silicic Acid-Free Membrane)

| casting solution | 14% cellulose triacetate (T 700, Bayer) |
| --- | --- |
| | 39% acetone |
| | 22% dioxane |
| | 25% formamide |

The membrane is made as described in Example 1 and dried.

| | | not dried | dried |
| --- | --- | --- | --- |
| $D_{H2O}$ | $(l/m^2h)$ | 234 | 138 |
| $D_{Ser}$ | $(l/m^2h)$ | 200 | 108 |
| $R_{Ser}$ | (%) | 99.6 | 99.5 |
| $D_{My}$ | $(l/m^2h)$ | 130 | 95 |
| $R_{My}$ | (%) | 97.9 | 96.8 |
| $D_{Cyt}$ | $(l/m^2h)$ | 217 | 120 |
| $R_{Cyt}$ | (%) | 67 | 70 |

This example shows the excellent properties of the undried acetate membrane and the still usable properties of the drid membrane which are largely lost during saponification, as evidenced by the following example.

EXAMPLE 1c

The membrane according to Example 1c is saponified and dried, as indicated in Example 1. The properties are as follows:

| | | not dried | dried |
| --- | --- | --- | --- |
| $D_{H2O}$ | $(l/m^2h)$ | 56.8 | 41.2 |
| $D_{Ser}$ | $(l/m^2h)$ | 53.4 | 40.1 |
| $R_{Ser}$ | (%) | 97.1 | 98.9 |
| $D_{My}$ | $(l/m^2h)$ | 48.8 | 40.1 |
| $R_{My}$ | (%) | 90.5 | 95.4 |
| $D_{Cyt}$ | $(l/m^2h)$ | 55.2 | 40.0 |
| $R_{Cyt}$ | (%) | 50.0 | 55.0 |

The test conditions are the same as indicated in the preceding examples.

In contrast to the membrane according to Example 1, which largely retains the properties of the unsaponified starting material, the saponification—in the absence of the filler—is accompanied by a drastic reduction of the flow-through rates (in pure water to 24% of the starting value). The shrinking forces arising during the drying lead to a partial detachment of the membrane from the drying support while being torn. The detached portions are deformed irregularly so that they will subsequently no longer have a planar shape and thus are unusable for use in filtering apparatus.

We claim:

1. Asymmetrical dry ultrafiltration membrane based on cellulose hydrate, containing an addition comprising hydrophobic synthetic silicic acid.

2. A membrane in accordance with claim 1, wherein the synthetic silicic acid is a pyrogenic hydrophobic silicic acid.

3. A membrane in accordance with claim 1, wherein said synthetic silicic acid is precipitated dried hydrophobic cilicic acid.

4. A membrane in accordance with claim 1, wherein said addition constitutes 2 to 50% by weight of the total solid content.

5. A membrane in accordance with claim 4, wherein said addition constitutes 20 to 45% by weight of the total solid content.

6. A membrane in accordance with claim 4, wherein said addition constitutes 30 to 35% by weight of the total solid content.

7. A membrane in accordance with claim 1 prepared by casting, according to the precipitating bath process, from a casting solution consisting essentially of 8 to 20% by weight of cellulose triacetate or mixture of cellulose triacetate and cellulose diacetate, 2 to 50% by weight, referred to the total solid content of the final membrane, of hydrophobic silicic acid, acetone and dioxane at a ratio of 2:1 to 1:2 with respect to each other, and a lower alkyl amide, wherein the ratio to the solid content is 0.8:1 to 4:1, and converting said cast membrane into a hydrate membrane by saponification.

8. A membrane in accordance with claim 7, wherein the ratio of acetone to dioxane is 0.8 to 1.2:1.

9. A membrane in accordance with claim 7, wherein said amide is formamide, acetamide or a mixture thereof.

10. A process for the production of an asymmetrical dry ultrafiltration membrane, comprising:
    preparing a casting solution consisting essentially of:
        8 to 20% by weight of cellulose acetate comprising cellulose triacetate or a mixture of cellulose triacetate and cellulose diacetate,
        1 to 30% by weight, based on total solid content, of hydrophobic silicic acid,
        acetone and dioxane at a ratio of 2:1 to 1:2 with respect to each other, and
        0.8:1 to 4:1, based on the solid content, of a lower alkyl amide;
    casting the membrane according to the precipitating bath process using ice water as precipitating agent, wherein prior to the precipitation in ice water the cast membrane is subjected to evaporation for 2 to 90 seconds; and
    saponifying the precipitated but not dried membrane for several minutes in an alkali solution to a hydrate membrane.

11. A process in accordance with claim 10, further including the step of drying the cast saponified membrane after impregnation with glycerin.

12. A process in accordance with claim 10, wherein said alkali solution is ethanolic potassium hydroxide.

13. A process in accordance with claim 10, wherein said cellulose acetate comprises cellulose triacetate and 0–20% based on the total cellulose acetate of cellulose diacetate.

* * * * *